US006381570B2

(12) United States Patent
Li et al.

(10) Patent No.: US 6,381,570 B2
(45) Date of Patent: *Apr. 30, 2002

(54) ADAPTIVE TWO-THRESHOLD METHOD FOR DISCRIMINATING NOISE FROM SPEECH IN A COMMUNICATION SIGNAL

(75) Inventors: Dunling Li; Zoran Mladenovic, both of Rockville; Bogdan Kosanovic, Bethesda, all of MD (US)

(73) Assignee: Telogy Networks, Inc., Germantown, MD (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/249,108

(22) Filed: Feb. 12, 1999

(51) Int. Cl.[7] ................ G10L 15/00

(52) U.S. Cl. ................ 704/233; 704/226

(58) Field of Search ................ 704/226, 233, 704/221, 213

(56) References Cited

U.S. PATENT DOCUMENTS

| | | | | | |
|---|---|---|---|---|---|
| 4,052,568 | A | * | 10/1977 | Jankowski | 704/233 |
| 4,131,849 | A | | 12/1978 | Freeburg et al. | 325/54 |
| 4,135,214 | A | | 1/1979 | Weber | 358/261 |
| 4,277,645 | A | * | 7/1981 | May, Jr. | 704/233 |
| 4,589,131 | A | * | 5/1986 | Hovervath et al. | 704/233 |
| 4,696,040 | A | * | 9/1987 | Doddington et al. | 704/234 |
| 4,829,578 | A | * | 5/1989 | Roberts | 704/233 |
| 5,359,593 | A | | 10/1994 | Derby et al. | 370/17 |
| 5,541,911 | A | | 7/1996 | Nilakantan et al. | 370/13 |
| 5,579,437 | A | | 11/1996 | Fette et al. | 395/2.71 |
| 5,617,508 | A | * | 4/1997 | Reaves | 704/233 |
| 5,623,492 | A | | 4/1997 | Teraslinna | 370/397 |
| 5,812,525 | A | | 9/1998 | Teraslinna | 370/229 |
| 5,815,492 | A | | 9/1998 | Berthaud et al. | 370/234 |
| 5,826,230 | A | * | 10/1998 | Reaves | 704/233 |
| 5,838,274 | A | | 11/1998 | Johnson et al. | 341/155 |
| 5,864,311 | A | | 1/1999 | Johnson et al. | 341/155 |
| 5,991,718 | A | * | 11/1999 | Malah | 704/233 |
| 6,157,670 | A | * | 12/2000 | Kosanovic | 375/227 |

OTHER PUBLICATIONS

Das et.; Multimode Sectral Coding of Speech at 2400 bps and Below ; Speech Coding for Telecommunications, 1995, IEEE; pp. 107–108.*

* cited by examiner

*Primary Examiner*—Tālivaldis Ivars Šmits
*Assistant Examiner*—Abul K. Azad
(74) *Attorney, Agent, or Firm*—Robby T. Holland; Frederick J. Telecky, Jr.

(57) ABSTRACT

A method of discriminating noise and voice energy in a communication signal. A signal is measured in a plurality of block periods, which are sampled to obtain a measurement of the block energy value for the signal. The blocks are compared to a noise threshold and to a voice threshold to discriminate between noise and voice. The thresholds for noise and voice are periodically updated based on the minimum and maximum energy levels measured for block energies. In a preferred embodiment, the voice energy threshold and noise energy threshold values are updated according to a formula where the revised thresholds are based upon a factor of the minimum and maximum energy levels of the current block and the most recent past block and the average energy of the previous blocks. Updating of threshold levels allows for more accurate estimation of noise and voice during changes in either noise, voice or both to avoid missclassification of noise and/or voice.

10 Claims, 3 Drawing Sheets

ADAPTIVE TWO-THRESHOLD METHOD FOR DISCRIMINATING NOISE FROM SPEECH IN A COMMUNICATION SIGNAL

BACKGROUND OF THE INVENTION

1. Field of the Invention

The invention relates to methods for conservation of bandwidth in a packet network. More specifically, the invention relates to methods for reducing the bandwidth consumption in voice-over packet networks by improved detection of active signals, background noise, and silence.

2. Description of the Background Art

A system for bandwidth savings, known as time assignment speech interpolation (TASI), was introduced to increase the capacity of submarine telephone cables used in analog telephony. TASI was subsequently replaced with a similar digital system. Such schemes are commonly known as digital speech interpolation (DSI) systems. As multimode and variable-rate speech coding techniques have improved, several promising silence compression standards have been developed and issued to address the bandwidth saving problem. The algorithm standardized by the GSM for use in the Pan-European digital Cellular Mobile Telephone Service is an example of a voice activity detection (VAD) technique designed for the mobile environment. Another VAD algorithm in wireless applications is provided with the ITA/EIA/IS-127 Enhanced Variable Rate Codec standard. There are two silence compression standards from ITU: G.723.1 Annex A, and G.729 Annex B.

Although these standards for bandwidth savings are very effective, their complexity is very high. The complexity of these methods derives from the fact that they rely upon processing the spectral features of a signal, which requires an analysis of the frequency and/or spectrum of the signal to identify the characteristics of speech, voice, or other distinct signals. These methods require adaptive algorithms to reduce noise, band pass filters to isolate speech, and the like to identify accurately characteristics of the signal to detect voice from other sounds, signals, or noise.

Complex standards require complex algorithms and therefore require significant processing capabilities. The method of the present invention significantly reduces complexity and therefore can be implemented in high channel density wired telephony applications. The present invention is simple in terms of processing and memory requirements and results in excellent performance.

SUMMARY OF THE INVENTION

In voice-over packet applications, speech signal is transmitted using data packets. The general telephone network will limit the bandwidth of the speech signal to 300 to 3,400 Hz range. In most speech codecs, the signal is sampled at 8 Khz resulting in the maximum signal bandwidth of 4 Khz. Each sample is represented with 16 bits, resulting in a 128 kbps bit rate. To save on bandwidth, PCM and ADPCM codecs are widely used in telephony applications and are important in high channel density implementation of voice-over packet applications. For the purpose of bandwidth savings with PCM and ADPCM codecs, voice activity detection is used to distinguish silence from active signal. The silence packets are not transmitted during any non-speech interval, effectively increasing the number of channels. In voice-over packet applications, the input speech level can be varied from −50dBm0 to 0dBm0, facsimile signal level varies from −48dBm0 to 0dBm0, the noise properties may change considerably during a conversation.

To detect signal activity accurately under different signal input and noise conditions, the energy threshold is adapted to the input signal and noise levels. Because of its adaptive function, the corresponding signal activity detection algorithm herein provides bandwidth savings with low complexity and low delay and performs well for a wide range of signal energy input levels and background noise environments as well as signal energy level changes. Because the bandwidth savings may change based on packet network traffic load, the algorithm is dynamically configurable to adjust the bandwidth savings percentages.

In development of voice-over packet network applications, a reliable bandwidth saving method is crucial to achieve a desirable balance between acceptable perceived sound quality and reduction in bandwidth requirements. Due to a variety of working conditions a number of challenges are imposed upon such a method. The bandwidth savings needs to be accomplished with both low delay and low complexity. The method must perform well for a wide range of input signal levels, must work in a variety of background noise environments, and must be robust in the presence of active signal and/or background noise level changes. Since the bandwidth requirements may change based on network factors such as load or traffic conditions or because of changing performance needs, the present invention is dynamically configurable to perform well under different requirements. It is common for the noise environment to alter in real-time, and the present invention dynamically adjusts through monitoring such changes to accomplish bandwidth savings and to perform well under a wide variety of conditions.

The present invention accomplishes efficient savings in bandwidth through a system for active signal (e.g., voice, facsimile, dialtone) and background noise detection and discrimination which utilizes block energy threshold adaptation, adaptive marginal signal/noise discrimination, state control logic, and active signal smoothing. The system distinguishes active signal (e.g., voice, speech, etc.) from background noise to allow for the compression or elimination of periods of silence or background noise. The system includes a state machine for logic control in establishing a dynamic adaptive threshold, below which the signal is identified as silence or background noise, and above which the signal is identified as active signal. The threshold is established by factors, including an active signal estimation technique from discrimination of noise below a first threshold and active signal above a second threshold. Signal between the thresholds cannot be discriminated and is therefore not used in the estimation to avoid loss of voice through misidentification as noise or silence. The system is efficient in detection of active signals and elimination of noise, while maintaining a safety margin to avoid degradation of voice quality by misidentification of low voice signals as background or silence.

The state machine, FIG. 2, includes the flow logic, FIG. 3, for updating the adaptive block energy threshold used for threshold detection, FIG. 1. There are three states in the state machine: learning state, converged state, and constant envelope state. Learning state is the initial and default state, where the system does not have any reliable estimates of noise or active signal energy levels. The state control logic 6 is in converged state when the current energy level threshold is acceptable and the noise and signal level estimations are reliable. When the input signal has an approximate constant envelope, the state machine is in the constant envelope state to distinguish facsimile from background noise in order to identify facsimile as active signal, not noise.

The system utilizes signal energy detection to establish and adjust the adaptive lower and upper thresholds. The signal is divided into blocks of a desired length, and signal features relating to the signal energy level are extracted for analysis to determine signal feature characteristics used to establish noise and active signal predictive thresholds. These established thresholds are used to discriminate the signal.

A signal from a source is first processed to determine the energy $E_{(n)}$ of the signal. The energy level is processed into energy vectors corresponding to discrete time intervals, for analysis. Each block is first processed by comparison with an initial set of thresholds within a marginal signal and noise discriminator, to discriminate initially between noise and signal. If below a first noise threshold, the block is classified as noise. If above a second voice threshold, the block is classified as active signal. Once discriminated, blocks below the noise threshold are used in noise level estimation, and blocks above the active signal threshold are used in active signal level estimation. Blocks between the thresholds are not used in level estimation. In this manner the present invention creates a clear separation between signal and noise.

These processed signal blocks are then used to create active estimates of the noise level and of the active signal level. The estimation is a continuous processing activity updated as further signal blocks are discriminated and made available to the estimator. In the exemplary embodiment, estimation is performed using a combination RMS/geometric averaging of block energies under the control of the marginal signal and noise discriminator. However, either RMS or geometric averaging alone could be used, as could other power estimation techniques, sample based or block based averaging. The method of both sampling and averaging can be varied through a change of factors such as time constants, frame size for block energy threshold detection, changing noise and/or signal thresholds, elimination of a discrimination gap between noise and signal, estimate noise/voice division, etc., still within the scope of the invention as herein taught.

The estimates of noise level and active signal level are later used in establishing the adaptive thresholds used to process the current signal block in the threshold detector to determine if the signal is noise or voice used in establishing an output decision for use in compression for bandwidth savings.

The determined energy level $E_{(n)}$ of the signal is also supplied to a threshold detector to make the detection between noise and active signals. The current values of the adaptive thresholds within the detector, as established from the active estimates of noise signal and active signal level based upon the control of the state control logic, are used to classify an input block into "active signal" or "noise" comparing the corresponding block energy $E\ (_n)$ with the adaptive threshold. The threshold adaption is performed based upon a current one of several available algorithms selected by a state control logic based upon the dynamics of the signal estimation processing. Different threshold functions are applied to the detection based upon the reliability of these estimates and the consistency of the signal envelope.

Weak active signals, which may present intermittent low signal levels, can be misclassified as noise. In order to reduce misclassification, the output of the threshold detector is smoothed. By smoothing, short term active signal drops are not classified as noise and subsequently improperly compressed. The smoothed output of the threshold detector is used as the output decision of the system method. The smoothing mechanism is influenced by the traffic load configuration. In the exemplary embodiment, a hang-over period smoothing method is implemented. Alternative delay methods or smoothing algorithms can be implemented. However, the computational processing power needed to perform signal smoothing processing must be considered in implementing the present invention, which relies upon simplification for effective implementation.

The output decision is then used by the voice-over packet network communication system to implement the desired processing of the current packet for bandwidth savings by appropriate compression based upon the simplified active signal/noise discrimination of the present invention.

In energy-based signal activity detection, one of the difficulties is that a simple energy measure cannot distinguish low-level speech sounds (weak active signal) from background noise if the signal-to-noise ratio is not high enough. In the implementation of the preferred embodiment of the present invention as described below, the following assumptions have been made. However, these values can be adjusted to process signals according to desired design parameters while remaining within the inventive concept taught herein:

- during natural conversation, within a long enough period of time, there will exist at least one silence frame (i.e., a signal frame that does not contain speech sounds) of a minimum duration;
- during natural conversation, weak speech sounds should normally last only for short periods of time;
- the short-term statistics (up to 1.5 seconds) of a noise are stationary or pseudo-stationary;
- the block energy threshold should be a function of noise level, active signal level, and signal-to-noise ratio.

DETAILED DESCRIPTION OF PREFERRED EXEMPLARY EMBODIMENTS

Figure 1:
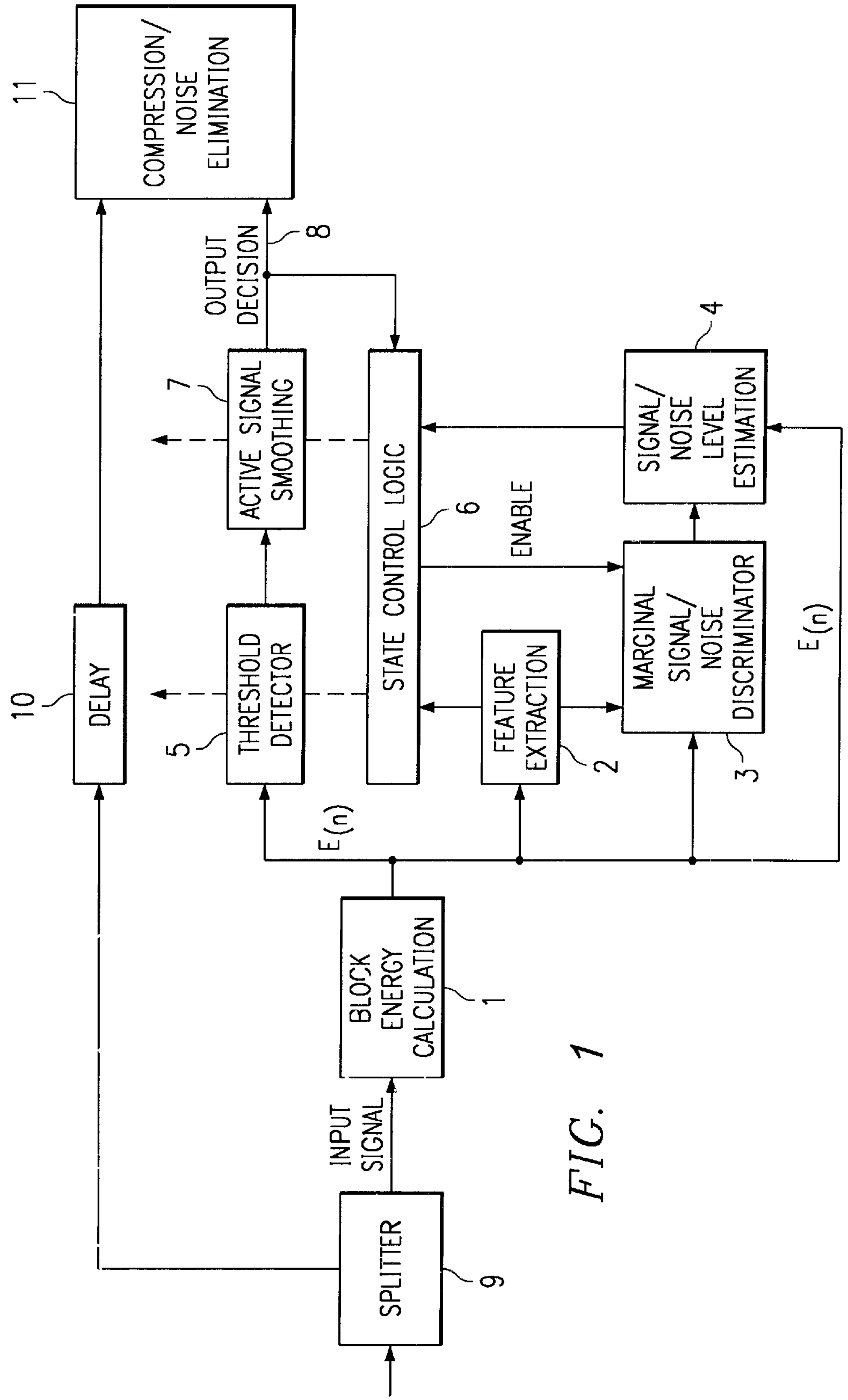
FIG. 1 is an overall block diagram for the signal processing and threshold detection system of the present invention.
Figure 2:
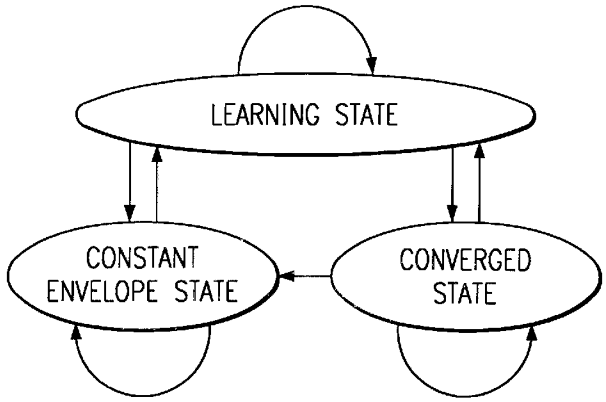
FIG. 2 is a block diagram illustrating the interaction of the states of the state control logic of the present invention.
Figure 3:
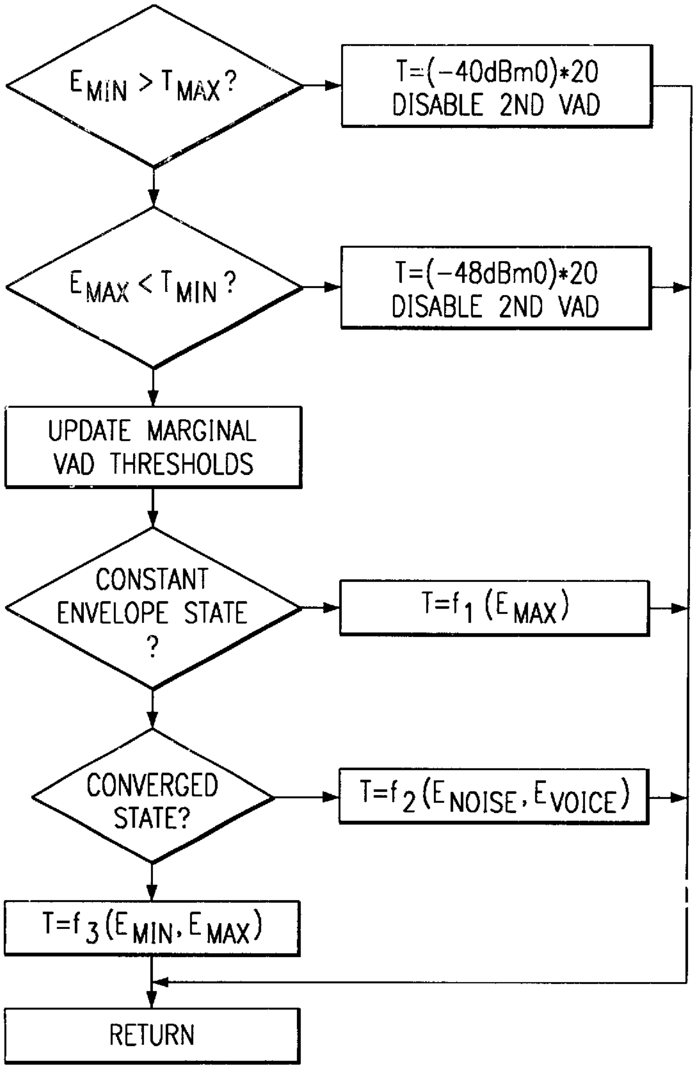
FIG. 3 is a logic flow chart illustrating the threshold update process of the state control logic of the present invention.

FIG. 1 is a block diagram illustrating an exemplary embodiment of the overall logic flow of the present invention. The signal from a source in a packet network passes through splitter 9 and is inputted into block 1 where the signal energy is calculated.

The signal energy is calculated using a block energy calculation technique where the input signal is partitioned into nonoverlapped 2.5 ms blocks. The 2.5 ms exemplary block size results in 20 samples/block, when an 8 kHz sampling rate is used. The block energy is calculated as a sum of sample squares or root-mean-square algorithm. The calculation can be performed according to a standard signal energy algorithm such as:

$$E_b = \sum_{i=0}^{N-1} (x(i))^2$$

for example, where: N=20 if 2.5 ms blocks are used and N=40 if 5 ms blocks are used.

Table I illustrates an exemplary typical result from the calculation of block energy. In the algorithm as implemented in an exemplary embodiment, the block length N =40 (samples of 5 ms), the threshold update period L=256 blocks (1.28 sec) and the update subperiod S=32 blocks (160 ms), the dimension of minimum/maximum energy vectors is D=8 (eight subperiods within a period or L/S). In the following example, shortened for the sake of illustration, N=5, L=12, and S=4, and therefore D=3.

TABLE I

| Block | Samples | Energy Value |
|---|---|---|
| 1 | −1 | |
| | 3 | |
| | 3 | |
| | 1 | |
| | 3 | 29 |
| 2 | 1 | |
| | −2 | |
| | −3 | |
| | −2 | |
| | 0 | 18 |
| 3 | 2 | |
| | −2 | |
| | 3 | |
| | 0 | |
| | −2 | 21 |
| 4 | 2 | |
| | 0 | |
| | −1 | |
| | 1 | |
| | 1 | 7 |
| 5 | 2 | |
| | 4 | |
| | 0 | |
| | 3 | |
| | −4 | 45 |
| 6 | 4 | |
| | −3 | |
| | −3 | |
| | 3 | |
| | 2 | 47 |
| 7 | −4 | |
| | −5 | |
| | 3 | |
| | −4 | |
| | −3 | 75 |
| 8 | 1 | |
| | −3 | |
| | −1 | |
| | −5 | |
| | 4 | 52 |
| 9 | 0 | |
| | −1 | |
| | 0 | |
| | −2 | |
| | −1 | 6 |
| 10 | −3 | |
| | 0 | |
| | 2 | |
| | 0 | |
| | 1 | 14 |

TABLE I-continued

| Block | Samples | Energy Value |
|---|---|---|
| 11 | −3 | |
| | −2 | |
| | 2 | |
| | 1 | |
| | −1 | 19 |
| 12 | 0 | |
| | 2 | |
| | −5 | |
| | 1 | |
| | −5 | 55 |

The calculated block energies are used to extract features from the input signal at block 2 of FIG. 1. Using the calculating block energies, the following features are extracted every 1.28 seconds:

1. Minimum energy vector.
2. Maximum energy vector.
3. Minimum energy.
4. Maximum energy. The minimum and maximum energy vectors are obtained by partitioning a 1.28-second period into eight parts. For each part the minimum and maximum block energies are determined. The minimum and maximum energies are determined from the minimum and maximum energy vectors, respectively. In an exemplary embodiment, 5 ms block energy features are extracted for each threshold update period (1.28 seconds). Other block size and update periods can be used as appropriate for the signal, the desired compression, active signal quality and bandwidth savings. The threshold is partitioned into eight non-overlapped subperiod intervals J of 160ms (length N=5 ms blocks). Minimum and maximum energy vectors $E_{vct—min}$ and $E_{vct—max}$ are extracted as follows:

Evct—min(j)=min{E(n)} and Evct—max (j)=max{E (n)} where: E(n) is 5 ms block energy, and j=0,1,2 . . . , 7 and n∈[jN, (j+1)N−1]

The minimum energy and maximum energy are the minimum or maximum 5 ms block energy during the whole threshold update period, i.e., Emin=min{Evct—min} and Emax=max{Evct—max}. The 2.5 ms block threshold block energy E(1) is extracted for the threshold detector 5 while the 2.5 ms block-based zero crossing rate is considered as an optional feature which can be extracted for consideration in threshold determination by the state control logic 6. Because zero crossing rate is strongly affected by dc offset, a highpass filter should be used if the input signal has dc components. Block-based zero crossing rate can be extracted as follows:

$$ZCR = \frac{1}{L} * \sum_{l=0}^{L-1} |\mathrm{sgn}(x(l)) - \mathrm{sgn}(x(l-1))|,$$

where L=20 is the block length.

Table II illustrates an exemplary feature extraction from the exemplary block energies illustrated in Table I.

TABLE II

| Block # | Block Energy | Emin Vector | Emax Vector | Min Energy | Max Energy |
|---|---|---|---|---|---|
| 1 | 29 | | | | |
| 2 | 18 | | | | |
| 3 | 21 | | | | |
| 4 | 7 | 7 | 29 | | |
| 5 | 45 | | | | |
| 6 | 47 | | | | |
| 7 | 75 | | | | |
| 8 | 52 | 45 | 75 | | |
| 9 | 6 | | | | |
| 10 | 14 | | | | |
| 11 | 19 | | | | |
| 12 | 55 | 6 | 55 | 6 | 75 |

Marginal Signal/Noise Discriminator.

The purpose of the marginal signal and noise discriminator, block 3, to keep a distance or gap between noise level and active signal level, so that overlapped parts of active signal and noise lock energies can be eliminated before the subsequent noise and active signal energy estimations. The noise energy level estimate and the active signal energy level estimate are used by state control logic 6 during threshold establishment in the "converged state." Establishing a region between a maximum noise level and a minimum active signal level is accomplished by maintaining two energy margins: one for noise, and the other for active signal. When block energy is below the noise margin, it is considered noise and used in noise level estimation. Similarly, when block energy is above the active signal margin, it is considered active signal and used in active signal level estimation. Otherwise, the block energy is not used in level estimation. The output of estimator 4 is used by state control logic 6 to select the current state based upon the signal envelope consistency and reliability. Therefore, the estimation of noise and active signal energy are independent of the output results of the bandwidth savings algorithm, and divergence due to misclassification can be avoided.

Signal/Noise Level Estimation.

The signal and noise level estimation 4 is performed using the geometric averaging of block energies under the control of the marginal signal and noise discriminator. The outputs are active signal level and noise level. These outputs represent an ongoing adaptive estimate of the average noise and active signal levels of the processed signal and can be determined according to the exemplary method below:

$$T_1=E_{min}+1/32(E_{max}-E_{min})$$

$$T_2=4E_{min}$$

$$T_{noise}=\min\{2\min\{T_1,T_2\},-21dBm0$$

$$T_{voice}=\min\{\max\{\alpha\max\{T_1,T_2\},-65dBm0\}, -17dBm0\}$$

$$\alpha=\begin{cases}16 & \frac{E_{max}}{E_{min}}>2^{13}\\ 4 & \frac{E_{max}}{E_{min}}\le 2^{13}\end{cases}$$

Both the noise and active signal (e.g., voice) thresholds are based on minimum and maximum block energy during one threshold updating period. Active signal and noise energy estimation is calculated by a geometric averaging as follows:

$$E_x(n)=(1-\alpha_x)E_x(n-1)+\alpha_x E(n)$$

where x is either voice or noise and $\alpha$ is adjusted for determination of voice or noise as follows:

$$\alpha_{voice}=\begin{cases}\frac{1}{64} & E(n)>T_{voice}\\ 0 & E(n)\le T_{voice}\end{cases}\qquad \alpha_{noise}=\begin{cases}\frac{1}{32} & E(n)<T_{noise}\\ 0 & E(n)\ge T_{noise}\end{cases}$$

where E(n) is 5 ms block energy, k and l are the number of voice and noise blocks respectively, from the marginal signal and noise discriminator 3.

State Control Logic.

The purpose of control logic 6 is to perform the threshold adaptation. The threshold used for detection 5 is adaptive in the present invention, based upon a number of factors derived from the block energy calculation, including the discrimination 3 and estimation 4. The adaptation of the block energy threshold is necessary for the effective discrimination based upon the algorithm performance. The state control logic 6 performs the adaption of the threshold through processing algorithums based upon the state of the logic.

State control logic 6 is designed as a state machine with the following states:

1. Constant Envelope.

The method is in this state when the input signal has approximately constant envelope as determined by the input from the marginal signal/noise discriminator 3. For example, facsimile signals, dial tone, and stationary noise signals would have a constant envelope. Minimum and maximum energy vectors are used in state transition. Zero crossing rate is also used if available. The threshold function for constant envelope state is:

$$T=\begin{cases}-50dBm0 & \frac{E_{max}}{E_{min}}\le 2\\ f_1(E_{max}) & \text{otherwise}\end{cases}$$

where:

$$f_1(E_{max})=\begin{cases}4E_{max} & E_{max}<-51dBm0\\ -45dBm0 & -51dBm0\le E_{max}<-48dBm0\\ 2E_{max} & E_{max}\ge -48dBm0\end{cases}$$

2. Learning.

Figure 4:
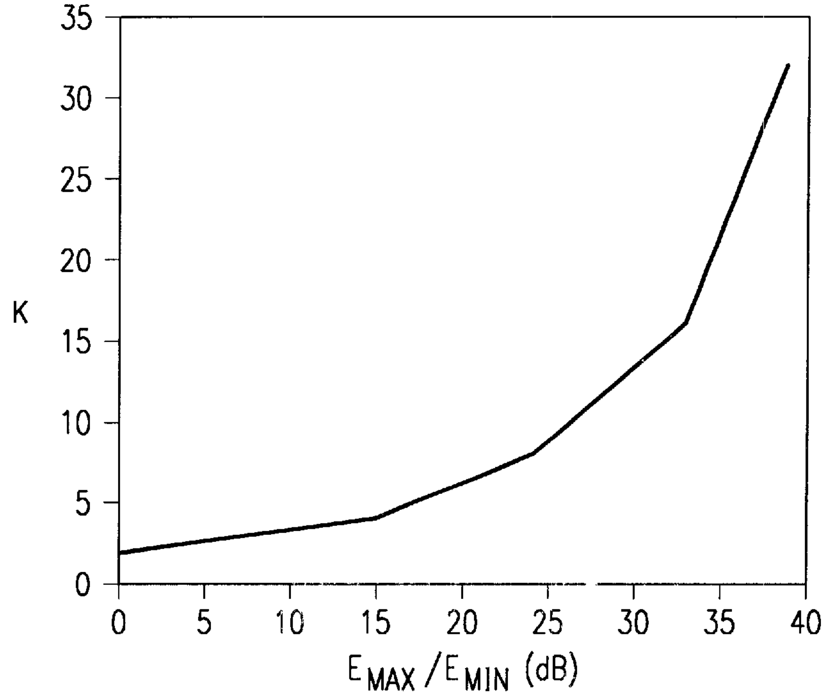
FIG. 4 is a graph illustrating the coefficient $K(E_{max}/E_{min})$ for the learning state of the state control logic of the present invention.

The method is in this state when the marginal signal/noise discriminator 3 does not have reliable estimates for the energy margins. The minimum and maximum energies are used to update the threshold as:

$$T=K\left(\frac{E_{max}}{E_{min}}\right)E_{min}$$

the coefficient $K(E_{max}/E_{min})$is illustrated in FIG. 4.

The system of the present invention will always start in the learning state until converged or constant envelope state is identified. The system state control logic 6 will revert to the learning state when either constant envelope or converged state cannot be identified.

3. Converged.

Figure 5:
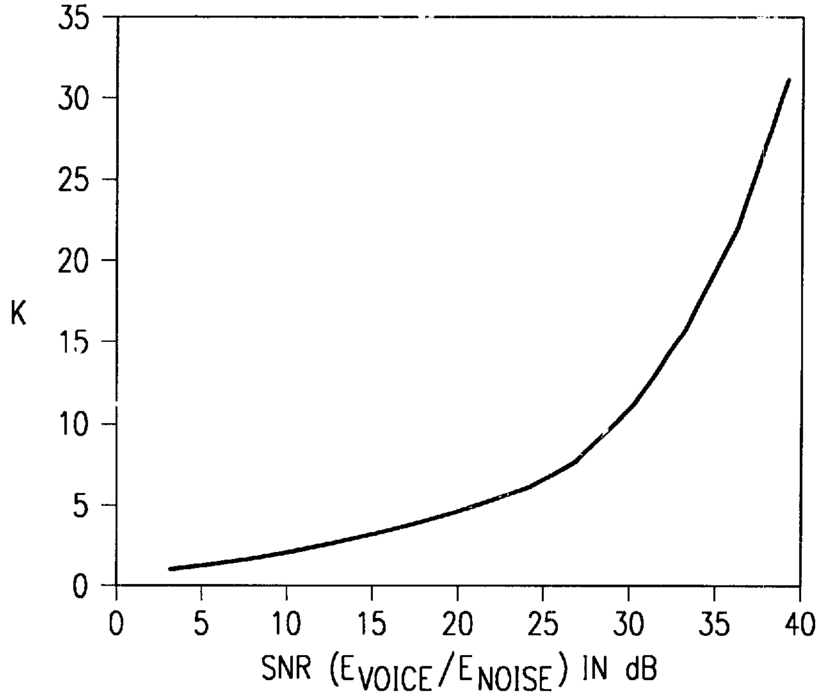
FIG. 5 is a graph illustrating the coefficient $K(E_{voice}/E_{noise})$ for the learning state of the state control logic of the present invention.

The method is in this state when the marginal signal/noise discriminator 3 has reliable estimates for the energy margins. The converged state threshold update is based on background noise and signal-to-noise ratio. However, the estimations of noise energy and signal-to-noise ratio are based on signal activity decisions. To minimize unstable operation, a marginal signal and noise discriminator is used in noise and signal level estimation. The converge state threshold algorithm is a function of average voice energy ($E_{voice}$) and noise energy ($E_{noise}$). $E_{voice}$ and $E_{noise}$ are estimated according to the marginal signal and noise discriminator 3. The threshold function for the converged state is:

$$T = K\left(\frac{E_{voice}}{E_{noise}}\right)E_{noise}$$

the coefficient $K(E_{voice}/E_{noise})$is illustrated in FIG. 5. If $(E_{voice}/E_{noise})<4$, then the learning state threshold function will be used to update the threshold in detector 5. To keep the threshold adapt smooth, the following interpolation is used during converged state where m is the number of the threshold update period:

$$T(m+1) = \frac{1}{2}T(m) + \frac{1}{2}T$$

The threshold is always bounded. The bounds depend on a traffic load.

Threshold Detector.

State control logic 6 determines the thresholds used by threshold detector 5. The active signal level and noise level outputs of estimator 4 are one factor used by control logic 6 to establish detection thresholds for the threshold detector 5. Other factors can include zero crossing discrimination. The current value of noise and active signal thresholds in adaptive threshold detector, block 5, are used to classify a current input block into "active signal" or "noise" using the corresponding block energy for the current input block calculated in block energy calculation 1. The threshold values inputted to the threshold detector 5 are controlled by the state control logic 6 which determines the threshold function to be applied in the detector 5 based upon the state of control logic 6 determined by the estimation of signal estimator 4.

Threshold detector 5 performs a decision for the current block to detect active signal or noise and assigns a status follows:

$$\text{status} = \begin{cases} \{\text{active signal}\} & E(k) \geq T \\ \text{noise} & E(k) < T \end{cases}$$

where T is adaptive 2.5 ms block energy threshold.

An input frame is partitioned into non-overlapped 2.5 ms block (20 samples/block). A decision is made for each block based on the block energy. In an embodiment with an optional zero crossing rate available, an additional threshold detection step is utilized when the energy threshold detection detects the current block as noise, as follows:

$$\text{status} = \begin{cases} \text{active signal} & E(k) \geq T \text{ or } ZCR(k) \geq T_{zcr} \\ \text{noise} & \text{otherwise} \end{cases}$$

where $T_{zcr}$ is fixed zero crossing rate threshold, which, for example, can be chosen as 0.7. The purpose of using an additional zero crossing rate detector is to minimize the potential misclassification between noise and weak active signal at the beginning of an active signal, such as the beginning of a conversation.

Active Signal Smoothing.

In order to reduce the potential for misclassification of weak active signal as noise, the output of the threshold detector 5 is smoothed 7. Smoothing can be accomplished by providing a hang-over period for indicating active signal detection for a period of time after the signal has dropped below the active signal threshold. This will have the advantage of avoiding drops or holes in voice transmission and can help to avoid chopping of the end of speech. Other methods of smoothing can also be implemented within the scope of the invention. The output of threshold detector 5, after smoothing, is used as the output decision 8 of the method. The smoothing mechanism is influenced by the traffic load configuration. Typically, the output signal of the detector can indicate false noise detection in the presence of a short-lived weak active signal. By smoothing the signal, short noise detections can be significantly reduced. Under high traffic loads, it may be desirable to reduce the degree of smoothing to allow increased bandwidth savings with only slight potential degradation in voice quality. Under low traffic loads, it may be desirable to increase the degree of smoothing to achieve potentially greater voice quality with acceptable lower reductions in bandwidth savings. The dynamic adaptability of the present invention allows for change of smoothing based upon traffic and signal detection.

The output decision 8 is then supplied to the compression logic of the packet system in combination with the signal for the application of compression and/or noise elimination 11 as desired by the packet system. The portions of the signal classified as noise can be eliminated and the active signals passed or compressed as desired. The signal may need to be delayed 10 to adjust for the timing of the decision from the application of the method of the present invention.

In implementing the system of the present invention, the various parameters need to be adjusted to correspond to the signal, the equipment used in the packet network, and the desired tradeoff between compression and active signal transmission degradation. Any of the parameters (e.g., block size, sampling rate, threshold update period, hang-over period, minimum and maximum energy thresholds) as well the algorithms can be changed to get different effects within the scope of the invention. The algorithms can be implemented, and the system and the packet network can be monitored. The parameters can then be adapted to achieve the desired bandwidth conservation. The compression can depend on traffic load to adjust the parameters of the system actively.

A further specific exemplary implementation of the present invention is described in the paper entitled *Signal Dependent Bandwidth Saving Method in Voice-Over Packet Networks of Dunling* Li, Zoran Mladenovic, and Bogdan Kosanovic, attached hereto and incorporated by reference herein.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and as limiting.

We claim:

1. A method of discriminating noise and voice energy in a communication signal, comprising the steps of:

for a plurality of block periods:

sampling said signal a number of times to obtain sample values;

calculating a block energy value for said signal by summing the squares of said sample values from said number of samples; and for an update period equal to a sum of said plurality of block periods:

assigning a maximum block energy value calculated during said update period to a variable $E_{max}$;

assigning a minimum block energy value calculated during said update period to a variable $E_{min}$;

calculating a noise energy threshold value based on the relative values of $E_{max}$ and $E_{min}$, wherein between a first upper bound and a first lower bound said noise energy threshold may assume a continuum of values;

calculating a voice energy threshold value based on the relative values of $E_{max}$ and $E_{min}$, wherein between a second upper bound and a second lower bound said voice energy threshold may assume a continuum of values; and updating said noise energy threshold and said voice energy threshold in accordance with said calculations for their respective values;

said voice energy estimation value $E_{voice}$ is updated according to the formula:

$$E_{voice,\ n}=(1-\alpha_{voice})*E_{voice,n-1}+\alpha_{voice}*E_n,\ \text{where } E_{voice,\ n}$$

is said voice energy estimation value for said current block period, $\alpha_{voice}$ is a voice time constant, $E_{voice,\ n-1}$ is said voice energy estimation value for an immediately preceding voice block period, and $E_n$ is said current block energy; and said noise energy estimation value $E_{noise}$ is updated according to the formula:

$$E_{noise,\ n}=(1-\alpha_{noise})*E_{noise,n-1}+\alpha\text{-}_{noise}*E_n,\ \text{where } E_{noise,n}$$

is said noise energy estimation value for said current block period, $\alpha_{noise}$ is a noise time constant, $E_{noise,\ n-1}$ is said noise energy estimation value for an immediately preceding noise block period, $E_n$ is said current block energy.

2. The method of claim 1, further comprising the steps of:

performing the steps of claim 1 for a plurality of said update periods; and calculating an adaptive discrimination threshold, used to discriminate said block periods containing voice energy from those containing noise energy, based on the relative values of either $E_{max}$ and $E_{min}$ or a noise energy estimation variable, $E_{noise}$, and a voice energy estimation variable, $E_{voice}$, wherein between certain bounds said discrimination threshold may assume a continuum of values.

3. The method of claim 2, further comprising the step of:

selecting one of three algorithms for calculating said discrimination threshold based upon a number of characteristics of said signal, wherein a first algorithm, associated with a first state, is used to calculate said discrimination threshold when a noise energy margin and a voice energy margin are distinguishably detected in said signal;

a second algorithm, associated with a second state, is used to calculate said discrimination threshold when a tone or stationary noise is detected in said signal; and a third algorithm, associated with a third state, is used to calculate said discrimination threshold when neither said noise and voice energy margins are distinguishably detected nor said tone or stationary noise is detected in said signal.

4. The method of claim 3, wherein:

for said first algorithm, said discrimination threshold is assigned a value given by a product of said noise energy estimation variable $E_{noise}$ and a continuous function of the ratio of said voice energy estimation variable $E_{voice}$ to said variable $E_{noise}$;

for said second algorithm, said discrimination threshold is assigned a value of either a constant or a multiple of said variable value of $E_{max}$; and for said third algorithm, said discrimination threshold is assigned a value given by a product of said variable $E_{min}$ and a continuous function of the ratio of said variable $E_{max}$ to said variable $E_{min}$.

5. The method of claim 4, further comprising the steps of:

smoothing said third state discrimination threshold value for a current update period, of said plurality of update periods, using the equation expressed as: $T'_{m+1}=0.5*T_m+0.5*T_{m+1}$, where $T'_{m+1}$ is said smoothed third state discrimination threshold value for said current update period, $T_{m+1}$ is said third state discrimination threshold value for said current update period, and $T_m$ is said smoothed third state discrimination threshold value for a last previous update period, of said plurality of update periods, of said third state; and assigning said smoothed third state discrimination threshold value, T'm+1, for said current update period to said third state discrimination threshold value, $T_{m+1}$, for said current update period, wherein said smoothing reduces the instantaneous variability of said third state discrimination threshold.

6. The method of claim 5, further comprising the steps of:

calculating a value of said variable $E_{noise}$ using geometric averaging; and calculating a value of said variable $E_{voice}$ using geometric averaging.

7. The method of claim 6, further comprising the steps of:

ascribing said current block period as containing voice if said current block energy value exceeds said current state discrimination threshold value; and ascribing said current block period as containing noise if said current block energy value is less than said current state discrimination threshold value.

8. The method of claim 7, further comprising the steps of:

updating said voice energy estimation value $E_{voice}$ when said current block energy exceeds said voice energy threshold value; and updating said noise energy estimation value $E_{noise}$ when said current block energy is less than said noise energy threshold value.

9. The method of claim 7, further comprising the steps of:

calculating a zero cross rate of said signal for each of said plurality of block periods; and ascribing said current block period as containing voice if said zero cross rate of a block period immediately preceding said current block period exceeds or equals a zero cross rate threshold value.

10. The method of claim 9, wherein:

said zero cross rate, ZCR, is calculated according to the equation:

$$ZCR=\frac{1}{L}*\sum_{l=0}^{L-1}|\mathrm{sgn}(x(l))-\mathrm{sgn}(x(l-1))|,$$

where L is the number of samples in said current block and x(l) is said sample value for an $l^{th}$ sample of said number of samples.

* * * * *